May 18, 1926.

R. G. TUGENDHAT 1,584,825

BAKING MACHINE FOR WAFERS AND THE LIKE

Filed August 18, 1924    3 Sheets-Sheet 2

INVENTOR.
Robert George Tugendhat

May 18, 1926.
R. G. TUGENDHAT
1,584,825
BAKING MACHINE FOR WAFERS AND THE LIKE
Filed August 18, 1924     3 Sheets-Sheet 3
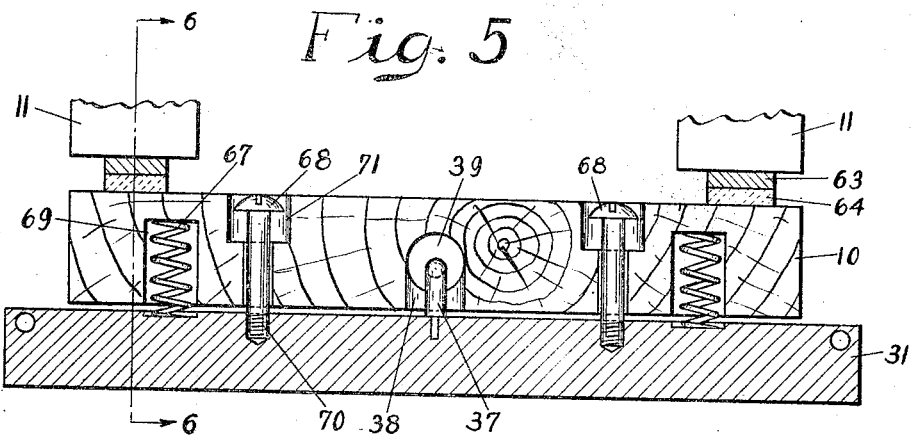
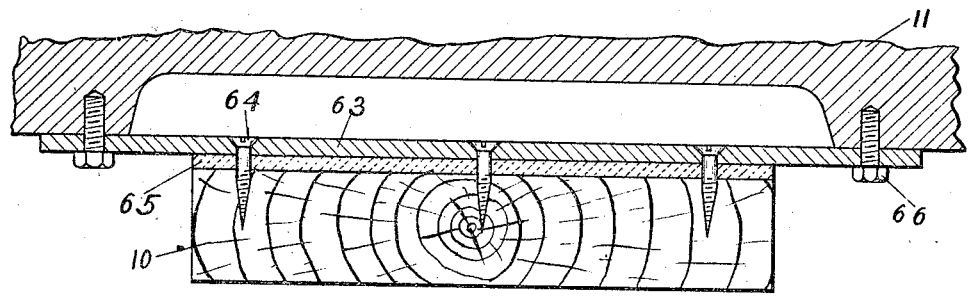
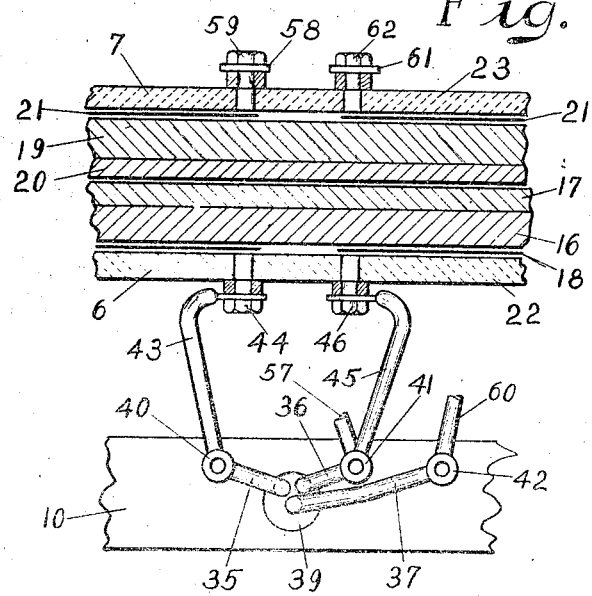
INVENTOR.
Robert George Tugendhat Patented May 18, 1926.

1,584,825

UNITED STATES PATENT OFFICE.

ROBERT GEORGE TUGENDHAT, OF SAGINAW, MICHIGAN, ASSIGNOR TO BAKER-PERKINS COMPANY, INCORPORATED, OF WHITE PLAINS, NEW YORK.

BAKING MACHINE FOR WAFERS AND THE LIKE.

Application filed August 18, 1924. Serial No. 732,764.

This invention relates to improvements in machines for baking wafers and the like and particularly of that type in which batter, dough or similar matter are baked in wheeled pans propelled through an endless track, and has for its object to perform the baking operation more efficiently, quickly and cheaply than could be done hitherto, to make the use of large baking pans possible and to render the operation clean and sanitary by preventing fumes and waste heat from filling the room, in which the machine is worked.

To this end, I provide each baking pan of the series forming the machine with electrical heating elements adapted to bake the material contained therein evenly and thoroughly as required, and lead the electric current to each of the pans by moving sliding or rolling-contacts so arranged that each pan receives its proper amount of electricity at any position on the endless track. As heating elements I preferably employ the zig-zag shaped flat elements described in my pending patent application, Serial No. 681,329, filed December 18, 1923, and preferably connect them to brushes flexibly carried by holders consisting of a block, plate, board or the like of insulating material and rigidly fixed to the bottom part of the carriage of each baking pan and sliding along busbars carried in an insulated manner by supports attached to the framework of the machine and receiving the current from the source of electricity. I prefer to use rather long brushes of about square cross section and fix to their top near its ends springs pointing upwardly and movably fitting in corresponding openings arranged in the underside of their holders. The brushes are arranged at such a distance from the busbars as to give the former suitable play, while the tension of the springs is such, that at every position of the pans the brushes make good contact with the busbars; means are provided that this play is limited to a safe maximum. The curved parts of the busbars are shaped so in relation to the curves of the track, on which the baking pans run, that the brushes remain always at least at some point or points in contact with the busbars. As in spite of this arrangement it may accidentally occur that the brushes of a pin are lifted out of contact with their busbars, I connect each adjacent pair of brushes near their ends in any manner answering the purpose, but preferably by links of such a length and so hinged together, that, when the pans are running on the horizontal parts of the track, these links point upwards, their combined length being greater than the distance of the two adjacent pans, to which they belong. In case the brushes of a pan are then out of contact, its heating elements will receive the current from the brushes of the adjacent pans, which arrangement makes an interruption of the heat supply, the continuity of which is a paramount requirement for the continuous satisfactory working of a baking machine, impossible.

The following description and the accompanying drawings serve for more minutely explaining the particular features, the principles of construction and the devices used therein of my invention. The drawings represent examples of its application to a standard type of automatic wafer baking machine first described in George S. Baker's United States Patent No. 353,837, December 7, 1886.

Fig. 4 is a section along line 4—4 of Fig. 2 and shows the connection of the lead wires leading from the brush to the lower and upper part of the pan.

Fig. 5 is a vertical longitudinal section of a brush and its holder.

Fig. 6 is a section through line 6—6 of Fig. 5 and shows how the brush holders are fixed to the wheel-supports of the pans.

Fig. 7 shows the arrangement of the links connecting the brushes in elevation, and Fig. 8 a plan view of the same.

The same numerals of reference are used to denote like or similar parts in all the figures.

Figure 1:
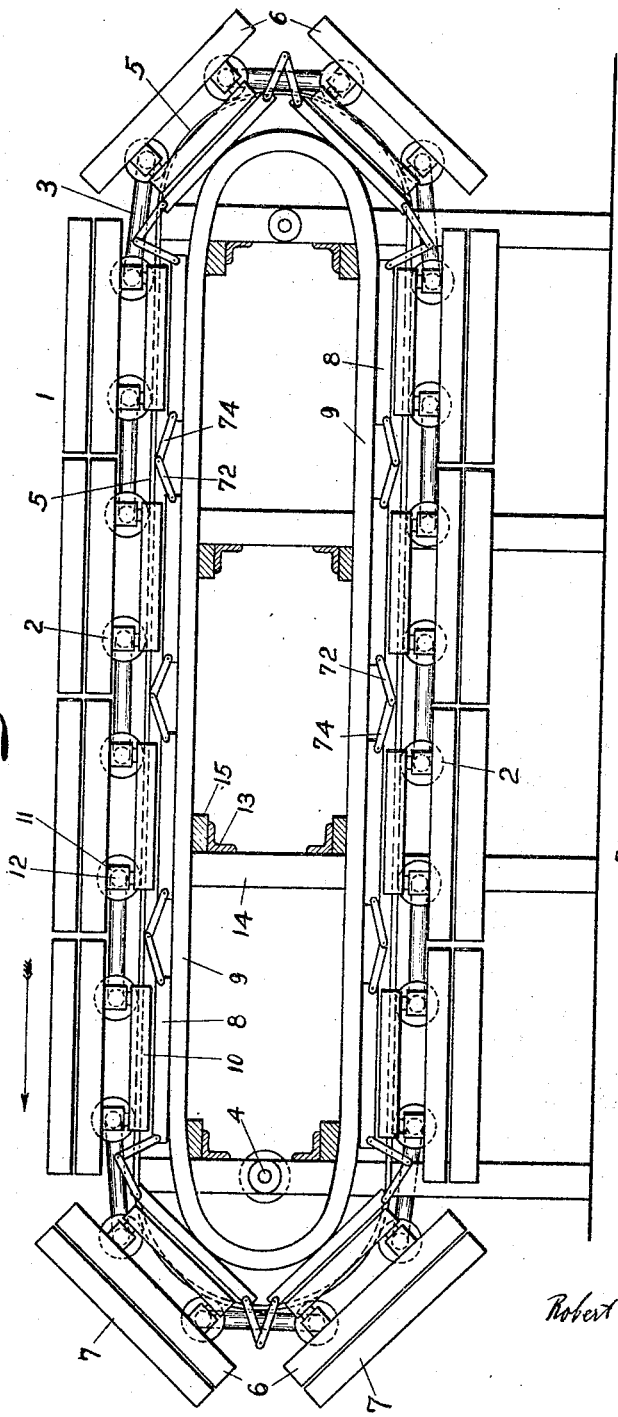
Fig. 1 is a longitudinal section of the machine, showing especially the arrangement of the pans, of the track, on which they run, of the brushes with their holders and links and of the busbars with their supports.

In the drawings the numeral 1 indicates the baking pans, 2 the wheels, which support them, 3 the chain links, which connect them and which are driven from the shaft 4 in any suitable known manner, and 5 the track, on which the pans move slowly in the direction of the arrow. The pans 1 consist of the lower part 6 carrying the material to be baked and of the lid 7. When ascending from the lower flight of the track 5, the lid 7 is automatically raised in the well-known manner described in the above mentioned patent and the baked wafers drop from the pan; as soon as the empty pan has then reached the horizontal position in the upper flight, it is automatically charged again with the due amount of material to be baked. In Fig. 1 the two pans on the way to the upper flight are therefore represented without their lid, while the pan next to them on the upper flight, having just been charged, is shown closed. The numeral 8 indicates the set of brushes gathering up the current from the corresponding set of busbars 9, which in their horizontal parts are parallel to the wheel track 5. The brushes 8 are flexibly carried by the holders 10, which are fixed to the supports 11 of the axle 12 of the wheels 2, and connected by links especially described in Figs. 7 and 8. Brackets 13, preferably suitable angle irons, are fixed to the uprights 14 of the framework supporting the machine and carry affixed thereto first the insulating board 15 and on top of the same the busbars 9.

Figure 2:
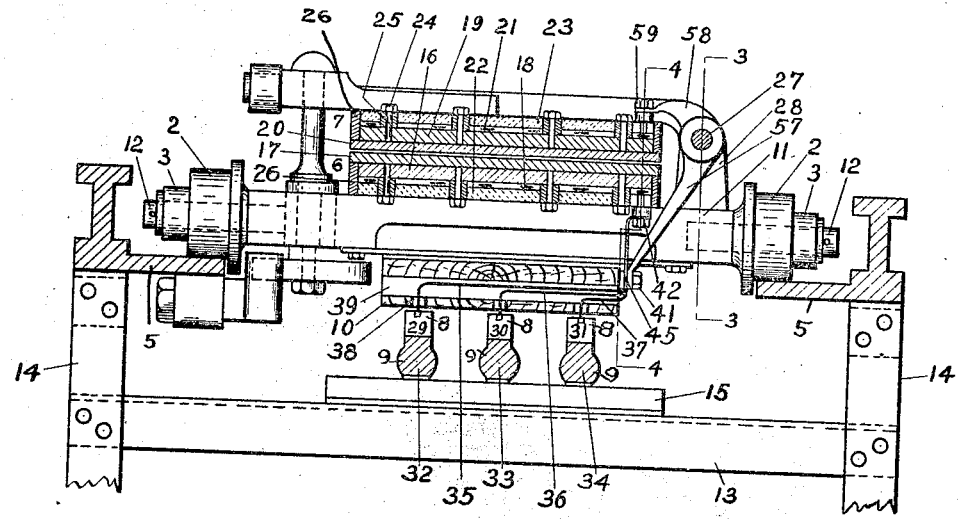
Fig. 2 is a vertical transverse section through a baking pan of the machine in its position on the track and shows its construction and the arrangement of the connections of the heating elements of the lower part of the pan and of its lid to the brushes, and of the busbars with their supports.

The heating elements of the pans shown in Fig. 2 and Fig. 9 consist of nichrome strips arranged in zig-zag fashion as described in my above mentioned pending patent application, but, while for the pan Fig. 9, the arrangement of the heaters in the pan is exactly the same as described therein, it is different in regard to the pan Fig. 2. In order to be able to use a somewhat stronger current and fewer turns of the heater strips, and at the same time to distribute the heat as evenly as possible to the baking plates of the pan shown in Fig. 2, I place between the latter and the thin mica sheets enveloping the flat heaters stout plates of a good heat conducting metal, preferably iron, and arrange at the opposite side of the heaters a thick board of good insulating material. Thus, the iron plate 16 is placed between the baking plate 17 and its heater 18 of the lower part 6, and the iron plate 19 between the baking plate 20 and its heater 21 of the lid 7 of the baking pan 1. The heaters 18 and 21 are covered at their opposite sides by the thick insulating boards 22 and 23 respectively. The whole, the baking plates, the intermediate iron plates, the heaters and the covering insulating boards are rigidly fixed together by the set screws 24, which in the latter pass through suitable metal bushings 25, and the whole is carried in a frame 26. The lid 7, which must be raised for charging and discharging the pan, is hinged on the pin 27 supported by the brackets 28 fixed on or integral with the wheel supports 11.

The set 8 of the brushes consists of three individual bars 29, 30 and 31, and the corresponding members of the set 9 of busbars are indicated by the numerals 32, 33 and 34 (Fig. 2). The wires 35, 36 and 37, fixed to the three brushes 29, 30 and 31 respectively are preferably flexible, pass through suitable individual vertical holes 38 arranged in the bottom part of the brush holder 10, which is common to the whole set 8, into and through the wider opening 39, which is provided in the holder 10 across the set of brushes, and are then fixed to the corresponding posts 40, 41 and 42 arranged at a side wall of the holder 10. (Fig. 4). From these points stout wires, ribbons, straps or the like lead to the heaters. The wire 43 starting at the post 40 and thus connected by the wire 35 to the brush 29 leads by means of the post 44 arranged at the bottom of the lower part 6 of the pan 1 to one end of the heater 18, and the wire 45 starting at the post 41 and connected thus by the wire 36 to the brush 30 leads by means of the post 46 at the bottom of part 6 to the other end of the heater 18.

As the wires leading to the heater of the lid 7 must follow the movements of the latter, it is necessary that this circuit is intersected by suitable movable contacts to agree with the same; I preferably use the device arranged at the hinge pin 27, as described in my above mentioned pending application. In this construction (Fig. 3) the tube 47 of insulating material closely surrounds the hinge pin 27 between the hinges of the lid 7. The tube-shaped contacts 48 and 49 are placed on the same so as to be able to revolve thereon, spaced by the tube 50 of insulating material and kept in position by the tubes 51 and 52 respectively, which also consist of insulating material. The contact tubes 48 and 49 are partly surrounded by the contact rings 53 and 54, which, while making perfect contact, will easily rotate thereon. Ample space is left for fixing the wires to the contact tubes 48 and 49, and projections 55 and 56, serving this purpose, keep at the same time the contact rings 53 and 54 respectively in their proper position thereon.

Figure 3:
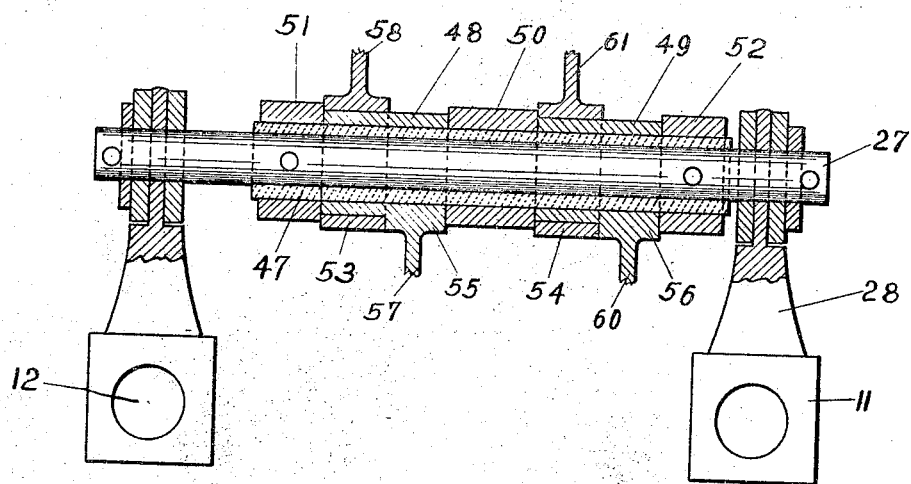
Fig. 3 is a section through line 3—3 of Fig. 2 and shows the revoluble contacts intersecting the circuit leading the current to the heating elements of the lid of the pan.

The wire 57 starting at the post 41, from which also issues the wire 45 leading to the heater 18 of the part 6 of the pan, and thus also connected by the wire 36 to the brush 30, is affixed to the contact tube 48, and the wire 58 leads from the contact ring 53, to which it is fixed, through the post 59 to one end of the heater 21 of the lid 7, and the wire 60 starting at the post 42 and connected thus by the wire 37 to the brush 31 is fixed to the contact tube 49, and the wire 61 leads from the contact ring 54, to which it is attached, through the post 62 to the other end of the heater 21. The wires 57 and 60 may be affixed to the contact tubes 48 and 49, and the wires 58 and 61 to the contact rings 53 and 54 respectively in any suitable manner; I usually prefer to make these wires and the corresponding tubes and rings of one piece as shown in Figs. 2 and 3.

The manner, in which the brushes of a pan are arranged at their common holder 10, is shown in Fig. 5 for the brush 31 as example. The holder 10, which may be conveniently made of wood, is rigidly screwed to the metal bars 63 by the wood screws 64, asbestos board 65 of suitable thickness being inserted between the top of the wooden holder 10 and the metal bars 63. The latter are fixed to the underside of the wheel support 11 by means of the capscrews 66 (Fig. 6). The top of the brush 31 carries besides the wire 37 two springs 67 soldered or otherwise suitably attached thereto, and two bolts 68 screwed into the same. The bottom part of the holder 10 is provided with five openings corresponding to the affixtures of the brush; in its midst with one opening 38 for the wire 37, wide enough to allow the latter some side play and ending in the opening 40 as mentioned above, near its ends with two openings 69 suitable to contain the springs 67, and between the latter and the wire hole 38 with two narrow circular openings 70 adapted for the bolts 68 to slide up and down in and ending in the two deep recesses 71 cut in the top of the holder 10 and holding the heads of the bolts 68. The length of the latter is so adjusted, that, when the brush is free, the springs will force it away from the holder 10, until the heads of the bolts 68 rest on the bottom of the recesses 71, and the position of the brush and its holder in relation to its busbar and the tension of the springs, are so arranged, that, the latter press the moving brush against the stationary busbar with the most favorable force to attain a perfect contact, while avoiding any undue friction.

In Fig. 7 and Fig. 8 the links connecting the brushes of two adjacent baking pans are shown bent upwards, in which position they are, when the latter are running on the horizontal part of the upper flight of the track. Each link connection consists of four bars provided with openings at each end, two bars 72 being arranged at each upright side of a brush and revolubly mounted on a pin 73 provided near the end of the latter, and two bars 74 at each upright side of the brush of an adjacent baking pan and revolubly mounted on a pin 75, provided near its end. The free ends of the two pairs of link bars 72 and 74, turn on the link pins 76, on which they are mounted in the usual way.

The links 72 and 74 serve to equalize the current received by the different heaters of the different pans, and to lead, in case one or all of the contacts of a pan are for any reason out of touch with their busbars or out of commission, electricity from the corresponding contacts of the nearest fully active pans to them so that the heaters of the pan, to which they belong, continue to function. In this way the articles in the different pans are baked evenly throughout, and, when any contact is out of commission, the machine need not be stopped for adjusting or replacing it, but works on continuously, baking the articles in the same even way. The faulty contact devices are then adjusted after work has been finished, which is a very important point, as it is practically and economically impossible to replace or adjust the contact devices of the machine while baking takes place.

I claim:

1. In a machine of the type described, the combination with an endless track having two flights, of an endless train of wheeled baking pans composed of a lower part holding the material to be baked and a lid hinged to the aforesaid lower part, of electric heaters, one for each lower part and one for each lid of the said pans, of stationary endless conductors located between the two flights of the said track and adapted to receive the current for the said heaters from the source of electricity, and of contacts sliding along the said conductors and flexibly connected to the said heaters so as to lead the current from the former to the latter.

2. In a machine of the type described, the combination with an endless track having two flights one above the other, of an endless train of wheeled baking pans propelled on said track, each baking pan consisting of a lower part holding the material to be baked and of a lid hinged to the aforesaid lower part, of electric heaters, one provided in each of the lower parts and in each of the lids of the said pans, of flexible brush contacts connected to the said heaters and so arranged at the underside of the lower parts of the said pans as to protrude into the space between the two flights of the said track, and of stationary endless busbars arranged parallel to each other in correspondence to and in touch with the said brush-contacts in the space between the two flights of the said track, and adapted to receive the current for the said heaters from the source of electricity.

3. In a machine of the type described, the combination with an endless train of baking pans, of wheel supports provided at two opposite sides of each pan, of wheels carried by the said supports, of an endless track having two flights—one above the other—and arranged for the said wheels carrying the said pans to travel on, of electric heaters provided in each of the said pans, of sets of rather long brushes—one set for each pan—arranged parallel to the said track, of flexible conductors connecting the said brushes of each pan with its heaters, of holders—one for each pan—made of insulating material, fixed to the said wheel supports and loosely carrying the said conductors, the ends of the latter being fixed to the said brushes, of stationary endless busbars arranged in correspondence to the said brushes gliding thereon and carried in an insulating manner by supports fixed to the frame work of the machine, and of springs provided at the said holders and so arranged and adapted as to press the said brushes against the said busbars with due force.

4. In a machine of the type described, the combination with an endless train of wheeled baking pans, of an endless track, on which the latter are propelled, of electric heaters provided in each of the said baking pans, of stationary endless conductors arranged in accordance with the course of travel of the said pans and adapted to receive the electricity for the latter from its source, of contacts provided at the said pans and so arranged and adapted as to lead the current from the said endless conductors to the said heaters of each of the said pans separately, and of means to transfer electricity from pan to pan.

5. In a machine of the type described, the combination with an endless train of wheeled baking pans, of an endless track, on which the latter are propelled, of electric heaters provided in each of the said baking pans, of stationary endless conductors arranged in accordance with the course of travel of the said pans and adapted to receive the electricity for the latter from its source, of contacts provided at the said pans and so arranged and adapted as to lead the current from the said endless conductors to the said heaters of each of the said pans separately, and of flexible means connecting the said contacts from pan to pan and adapted to transfer electricity from one to the other.

6. In a machine of the type described, a combination with an endless train of wheeled baking pans, of an endless track, on which the latter are propelled, of electric heaters provided in each of the said baking pans, of stationary endless busbars arranged in accordance with the course of travel of the said pans and adapted to receive the electricity for the latter from its source, of brush contacts provided at the said pans and so arranged and adapted as to lead the current from the said busbars to the said heaters of each of the said pans separately, and of hinged links connecting the said brush contacts from pan to pan for transferring electricity from one to the other.

ROBERT GEORGE TUGENDHAT.